United States Patent

[11] 3,623,057

| [72] | Inventors | Robert A. Hedin;<br>Alfiero F. Balzano, both of Los Angeles, Calif. |
|---|---|---|
| [21] | Appl. No. | 824,625 |
| [22] | Filed | May 14, 1969 |
| [45] | Patented | Nov. 23, 1971 |
| [73] | Assignee | R. B. Phinizy<br>Anaheim, Calif. |

[54] LASER PERIMETER INTRUSION DETECTION SYSTEM
13 Claims, 7 Drawing Figs.

[52] U.S. Cl. ............................................. 340/258 B,
250/83.3 IR, 250/199, 340/415
[51] Int. Cl. ....................................................... H04q 5/00,
H01j 39/00, G08b 13/16
[50] Field of Search ................................................ 340/258,
258 B, 415, 213; 331/94.5; 250/199, 83.3 IR;
350/286

[56] References Cited
UNITED STATES PATENTS

| 2,506,946 | 5/1950 | Walker ........................... | 340/258 |
| 3,089,065 | 5/1963 | Worden ........................... | 340/258 X |
| 3,210,546 | 10/1965 | Perron ........................... | 250/83.3 |
| 3,276,006 | 9/1966 | Hensen ........................... | 340/258 X |
| 3,329,946 | 7/1967 | Robbins ........................... | 340/258 |
| 3,335,285 | 8/1967 | Gally, Jr. et al. ............... | 340/258 X |
| 3,370,258 | 2/1968 | Cruse et al. ..................... | 340/258 |
| 3,471,845 | 10/1969 | Sokoloff ........................ | 340/258 |
| 3,474,443 | 10/1969 | Lightner et al. ................ | 340/415 |
| 3,493,894 | 2/1970 | Patel ............................. | 331/94.5 |
| 3,500,469 | 3/1970 | Plambeck et al. ................ | 340/213 |
| 3,509,359 | 4/1970 | Embling .......................... | 340/258 X |
| 3,517,327 | 6/1970 | Treuthart ....................... | 350/286 X |

*Primary Examiner*—John W. Caldwell
*Assistant Examiner*—Perry Palan
*Attorney*—Teagno & Toddy ABSTRACT: A laser perimeter intrusion detection system which includes means for providing laser beam components for defining the perimeter of a predetermined geographical area to be protected. The system includes a sensing subsystem which is comprised of a plurality of sensors for providing electrical outputs from the sensors, the electrical outputs being responsive to interruption of any of the laser beam components. The system has an electrical signal-processing and logic subsystem for identifying the specific portion of the perimeter controlled by any of the laser beam components when the particular component is traversed by an intruder. Included are means for chopper-modulating the laser beam to increase the difficulty of compromising the system and to make the laser beam invisible to the human eye.

ROBERT A. HEDIN
ALFIERO F. BALZANO
INVENTOR.

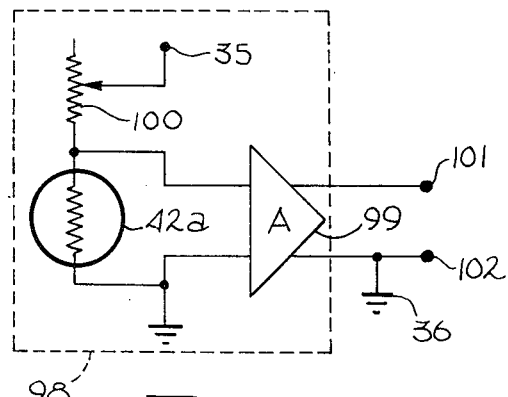
Fig. 3
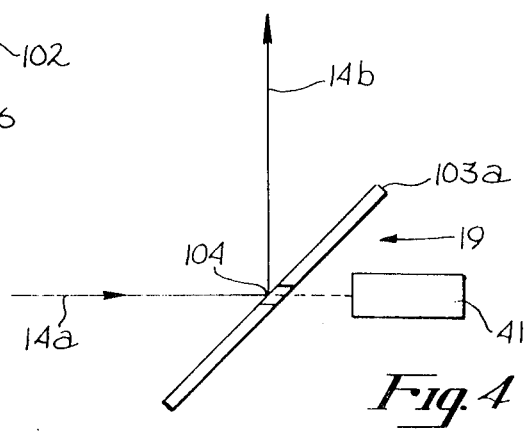
Fig. 4
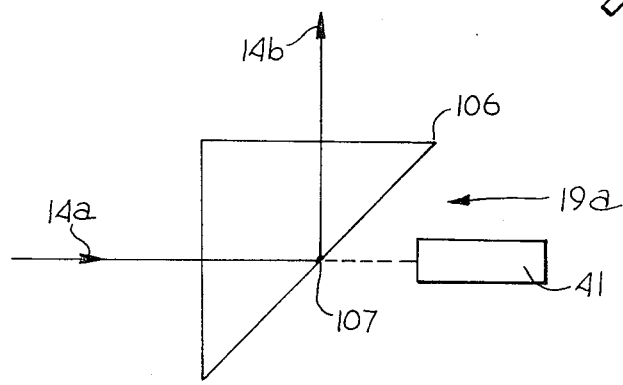
Fig. 5
Fig. 6
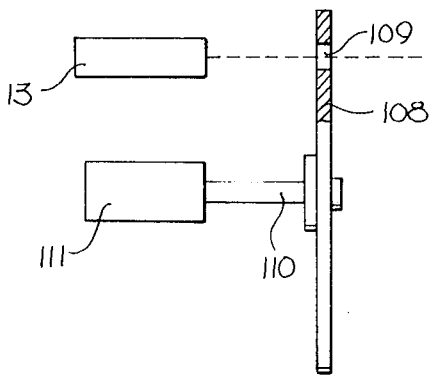
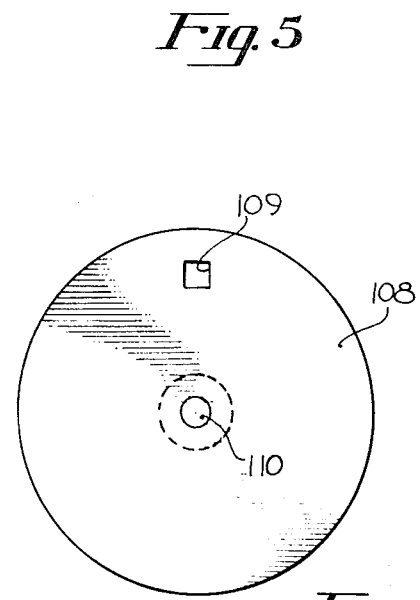
Fig. 7
ROBERT A. HEDIN
ALFIERO F. BALZANO
INVENTOR.
BY

LASER PERIMETER INTRUSION DETECTION SYSTEM

BACKGROUND OF THE INVENTION

Most intrusion alarm systems are either of the radar-scanning type, the ultrasonic standing-wave type, or the proximity-capacitive type.

The radar-type system does not provide perimeter protection in that it does not allow authorized personnel to work in a given area, and hence would only be used when no operations in that area are taking place.

The ultrasonic standing-wave-type system, also does not permit personnel to work in a given area and in addition can only protect an area that is completely enclosed, such as a room.

The proximity-type, although usable for perimeter protection, can be easily compromised.

Hence, no perimeter intrusion detection system that is foolproof is known to exist prior to the invention of the instant system.

SUMMARY OF THE INVENTION

The invention relates to an effective, reliable and relatively inexpensive laser perimeter intrusion detection system wherever a continuous laser beam or a modulated laser beam having pulses equal to or greater than 4 pulses per second may be used. The invention has a logic system which identifies the particular portion of the perimeter which an intruder is attempting to compromise. Included are differential amplifying systems with individual photoresistor inputs thereto, one photoresistor automatically adjusting for ambient light conditions and the other for the laser beam. The resultant output of the differential amplifier is balanced out to zero when normal laser beam and normal ambient light is received. When the laser beam is broken or interrupted or the ambient light is increased by an intruder attempting to compromise the system, a signal output from the system will result and an alarm will indicate at a central security station indicating the exact perimeter portion where intrusion is taking place. A system of logic circuitry with inhibit means permits only the interrupted laser beam portion to indicate on the panel and inhibits the other portions of the laser beam from activating an alarm. Alternate exemplary embodiments of sensors containing singled-ended amplifiers are provided in lieu of differential amplifiers for less expensive systems. Parts of the sensors are mirrors or prisms, photoresistors and amplifying means. The system is insensitive to normal activity within the protected area, as only traversing the perimeters thereof or illuminating the sensors with external light would set off the intrusion alarms which are provided at the central security station. Fast-flying birds, small animals, wind or noise would not affect the system, nor will temperature, pressure, daylight or darkness.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 3 is a schematic drawing of an alternate exemplary embodiment of the initial laser-sensing stage usable at each beam direction changing station and at the central station;

FIG. 4 is a plan view of an exemplary embodiment of a beam sensor usable at each beam-direction-changing station and at the central station;

FIG. 5 is a plan view of an alternate exemplary embodiment of a beam sensor usable at each beam-direction-changing station and at the central station;

FIG. 6 is an elevational view of a beam chopper-modulator optionally usable in the invention; and FIG. 7 is a front view of the rotatable disc of the beam chopper-modulator.

BASIC THEORY OF OPERATION

Figure 1:
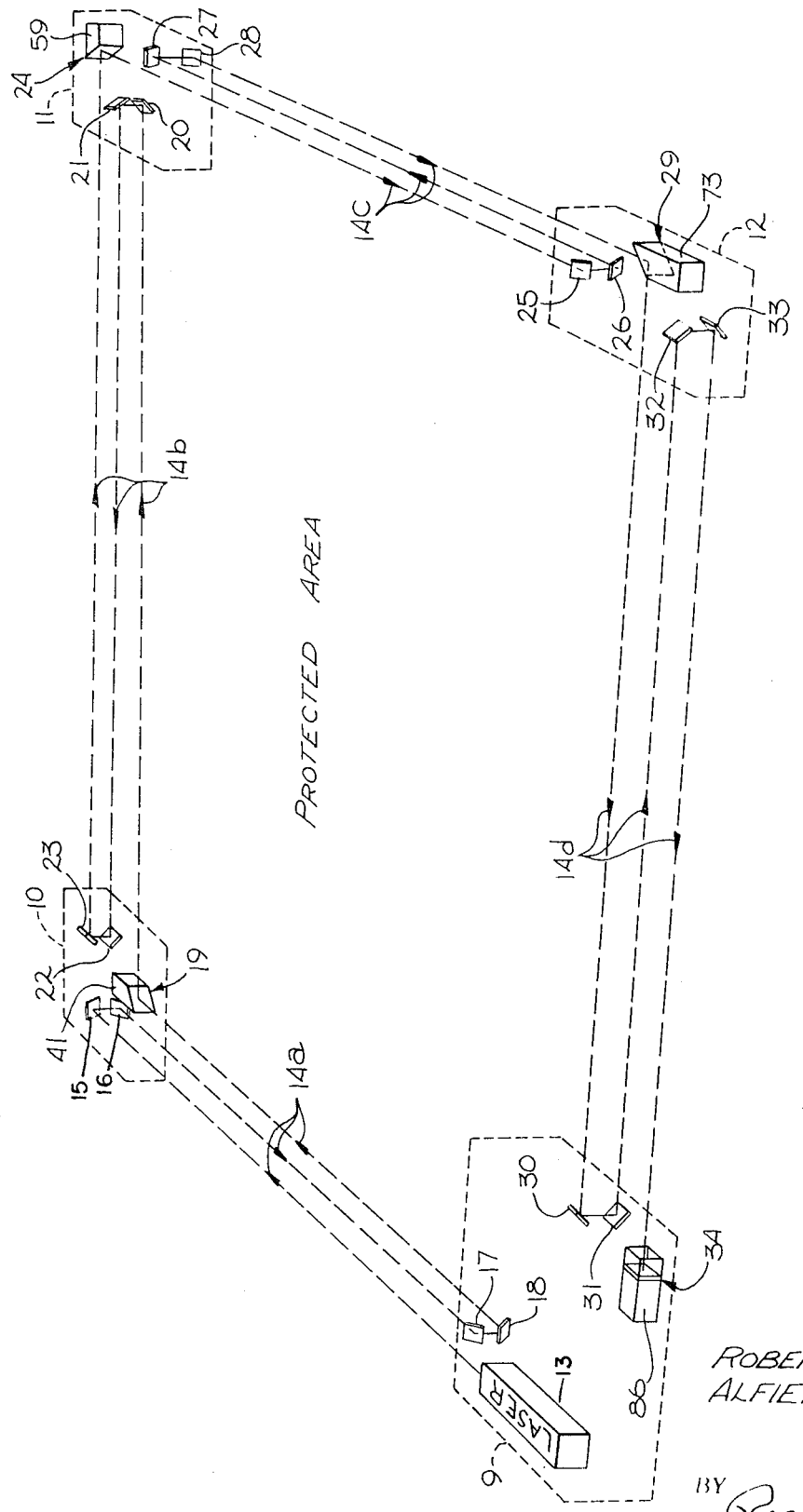
FIG. 1 is an optical schematic drawing of the laser perimeter detection intrusion system in accordance with the invention.
Figure 2:
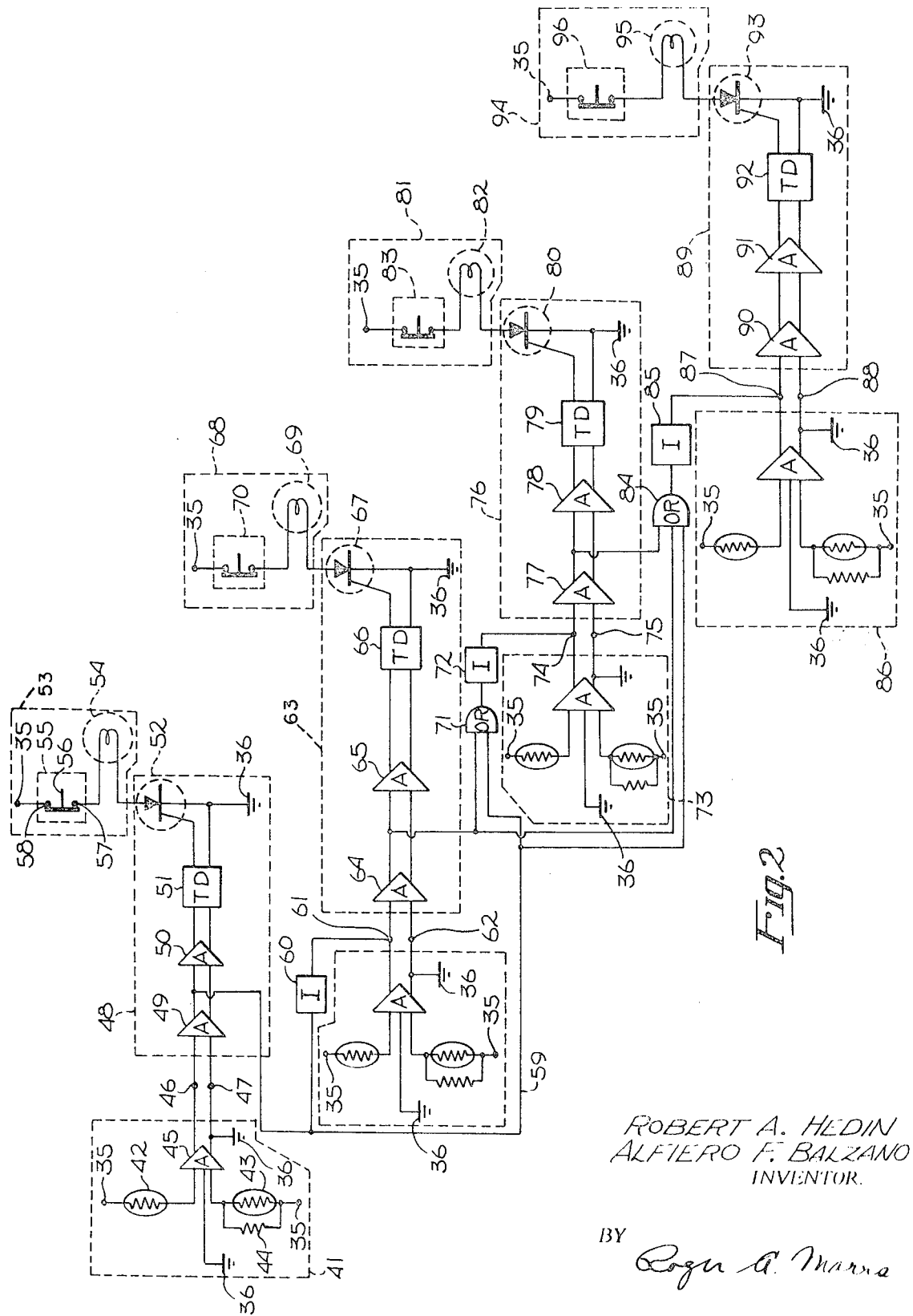
FIG. 2 is an electrical schematic and logic diagram showing the relationship of the electronic equipment used in the invention.

For a basic understanding of the laser system, reference is made particularly to FIGS. 1 and 2, as well as to FIGS. 3, 4, 5, 6 and 7.

Generally, the central station 9 will contain signal-processing means 48, 63, 76 and 89. This station also contains laser generator 13, mirrors 17, 18, 30 and 31, beam sensor 34, and indicating monitor intrusion panels 53, 68, 81 and 94.

The first beam-direction-changing station 10 contains beam sensor 19 and mirrors 15, 16, 22 and 23.

The second beam-direction-changing station 11 contains beam sensor 24, mirrors 20, 21, 27 and 28.

The third direction-changing station 12 contains beam sensor 29, and mirrors 25, 26, 32 and 33.

In general, the use of differential amplifying circuits, such as 41, 59, 73 and 86, indicated in FIG. 1 and shown in detail in FIG. 2, enables greater sensitivity response of the system making possible a decrease or increase in the particular sensitivity desired to fit a particular installation. Each differential amplifying circuit as shown for example by circuit 41 in FIG. 2, uses two photocells or photoresistors denoted at 42 and 43. Photoresistor 42 falls in resistance value as the laser beam impinges upon it. Photoresistor 43 is in the input circuit of the other side of the differential amplifier and is used to detect the ambient light condition. If a bright light condition such as sunlight prevails, the resistance of photoresistor 43 will fall biasing the differential amplifier 45. Similar results for similar conditions are provided by the other three differential amplifying means 59, 73 and 86. Photoresistor 42 will normally be shaded so as not to be affected by sunlight. If a foggy condition exists, photoresistor 43 will rise in resistance and, due to differential amplifying action, photoresistor 42 will appear more sensitive to the laser beam, its power or brilliance having been decreased due to the foggy condition. If the laser beam is broken, a signal output will be provided at terminals 46–47 as well as at terminals 61–62, 74–75, and 87–88 of the other three differential amplifiers when a similar condition exists. Photoresistor 43 may be biased or desensitized by using resistor 44 thereacross.

When using the alternate embodiment for the differential amplifying means, namely, one photoresistor and an unbalanced amplifier as in amplifying means 98 of FIG. 3 wherein the function of laser beam reception is provided by photoresistor 42a, then a light-absorbing adhesive may be utilized over the mirror surface at aperture 104 of FIG. 4 configuration or over the prism surfaces of prism 106 of FIG. 5 masking depression 107 so that light impinged on the photoresistor would be of decreased intensity thereby making the system insensitive to normal ambient light. Naturally, the amplification levels of the remaining portions of the system are adjusted to respond to light above ambient light conditions such as the laser beam, and to light that may be imposed from external sources by intruders seeking to make the system inoperative.

The intruder seeking to compromise the system will fail to do so in view of the fact that the light reflection components are so positioned that it is impossible to approach the central or light-direction-changing stations without interrupting at least one laser beam component, and light imposed upon the mirrors or sensors above a predetermined intensity level will set off the alarm system.

If a pulsed laser beam is used at the general rate of 4 or more pulses per second, by utilizing the chopper-modulator of FIGS. 6 and 7, the amplifier output of the pulse train being fed to an integrator circuit is interspersed between the last amplifying stage and the time delay circuit, and intrusion will be even more difficult in view of the fact that the stream of pulses must be interrupted at exactly the proper time. The intruder must have equipment that is capable of being synchronized with the pulse periods. Since the probability of this occurrence is remote, any attempt at compromising a pulsed laser system is for all intents and purposes impossible. The chopper-modulator of FIGS. 6 and 7 is a device consisting of a rotatable disc 108 rotating at approximately 4 times per second or greater, although any speed rate may be employed. This disc has an aperture 109 at its outer periphery and is driven by shaft 110 of motor 111 on which disc 108 is mounted. The laser beam is permitted to pass through aperture 109 every one-fourth of a second or sometimes more frequently, if desired. Since aperture 109 is about 10° wide, the pulse will be passed one unit of time out of every 36 units of time. This would indicate a very short time duration for a given pulse. It can be appreciated that it would be impossible for an intruder to match these time units exactly as well as the duty cycle per pulse and the position of the pulse train in the duty cycle. Further, it should be noted that chopping the laser beam at a rapid rate makes the beam invisible to the human eye and makes it additionally impossible of overt or covert action by an intruder.

EXEMPLARY EMBODIMENTS AND STRUCTURAL RELATIONSHIPS

Reference is made to FIG. 1 which illustrates the optics of the system. Whenever the perimeter bounded by the laser beam is traversed by an intruder, an alarm is set off. This perimeter may be defined by central station 9 at one corner thereof and by beam-changing stations 10, 11 and 12 at three other corners of the area sought to be secured against intrusion without disturbing any authorized activity that may be taking place within the boundaries of the area perimeter.

Laser beam generator 13 provides a laser beam consisting of components 14a, 14b, 14c and 14d. The components 14a are directed to mirror 15 and reflected therefrom onto mirror 16 which in turn is directed to mirror 17, reflected therefrom to mirror 18 and directed to a mirror which is an integral part of beam sensor 19. Mirrors 15 and 16 and beam sensor 19 are housed in direction-changing station 10, while mirrors 17 and 18 are housed in the central station.

The components 14b of the laser beam are further reflected from the mirror of sensor 19 and directed at mirror 20 which in turn is reflected therefrom onto mirror 21. The beam is further reflected therefrom and directed at mirror 22 and to mirror 23, then is redirected to a mirror that is an integral part of beam sensor 24. Mirrors 20 and 21 and beam sensor 24 are housed in direction-changing station 11, while mirrors 22 and 23 are housed in direction-changing station 10.

The components 14c of the laser beam are further reflected from the mirror of beam sensor 24 and directed at mirror 25 which in turn is reflected therefrom onto mirror 26. The beam is further reflected from mirror 26 and directed to mirror 27, reflected therefrom onto mirror 28 and directed onto a mirror which is part of beam sensor 29. Mirrors 27 and 28 and beam sensor 24 are housed in beam-changing station 11, while mirrors 25 and 26 are housed in beam-changing station 12.

The components 14d of the laser beam are reflected from the mirror of beam sensor 29 and directed to mirror 30. The beam is further reflected from mirror 30 and directed to mirror 31 wherefrom it is directed to mirror 32, reflected therefrom and directed to mirror 33 and reflected from mirror 33 onto mirror 34 which is an integral part of beam sensor 34. Mirrors 32 and 33 and beam sensor 29 are housed in beam-direction-changing station 12 while mirrors 30 and 31, beam sensor 34 and laser beam generator 13 are housed in central station 9. It should be appreciated that the laser beam components 14a, 14b, 14c, and 14d cooperate to form a continuous laser beam around the perimeter of the protected area.

Reference is made to FIGS. 1, 2, 3, 4 and 5 wherein beam sensor 19 has an integral portion thereof differential amplifying means 41, or its alternate embodiment unbalanced amplifying means 98 which is used in lieu of amplifying means 41. Amplifying means 98, FIG. 3, has single-ended or unbalanced input amplifier 99, the input thereof having photoresistor 42a connected thereto with bias control 100 connected between the direct current power input terminal 35 and one end of photoresistor 42a for providing bias and controlling the sensitivity of amplifier 99. The terminals 101 and 102 are hence respectively connected across terminals 46 and 47, FIG. 2, when amplifying means 41 is not used and similar circuits to means 98 are connected across terminals 61 and 62 in lieu of circuit 59, across terminals 74 and 75 in lieu of circuit 73, and across terminals 87 and 88 in lieu of circuit 86. Normally, the mirror of beam sensor 19 is like mirror 103a, FIG. 4, which has an aperture 104 through which a portion of the laser beam is communicated to photoresistor 42 of amplifying means 41, FIG. 2, or to photoresistor 42a of the alternate amplifying means 98.

Beam sensor 24, FIG. 1, has as an integral portion thereof differential amplifying means 59, or its alternate embodiment consisting of an unbalanced amplifying means identical to means 98 hereinabove described, the output terminals thereof being connected to terminals 61 and 62 respectively, FIG. 2, in lieu of the output of amplifying means 59. Normally, beam sensor 24 has provided a mirror similar to mirror 103a and an aperture therein similar to aperture 104 through which a portion of the laser beam is applied to the photoresistors of amplifying means 59 or to the alternate amplifying means similar to means 98.

Beam sensor 29 has as an integral portion thereof differential amplifying means 73 or its alternate embodiment consisting of an unbalanced amplifying means indentical to means 98 hereinabove described, the output terminals thereof being connected to terminals 74 and 75 respectively in lieu of the output of amplifying means 73. Normally, beam sensor 29 has provided a mirror similar to mirror 103a and an aperture therein similar to aperture 104 through which a portion of the laser beam is applied to the photoresistors of amplifying means 73 or to the alternate amplifying means similar to means 98.

Beam sensor 34 has as an integral portion thereof differential amplifying means 86 or its alternate embodiment consisting of unbalanced amplifying means identical to means 98 hereinabove described, the output terminals thereof being connected to terminals 87 and 88 respectively in lieu of the output of amplifying means 86. Normally, beam sensor 34 has provided a mirror similar to mirror 103a, having an aperture therein similar to aperture 104 through which a portion of the laser beam is applied to the photoresistor of amplifying means 86 or to the alternate amplifying means similar to means 98.

Exemplary of the alternate beam sensor that may replace beam sensors 19, 24, 29 and 34 is shown in FIG. 5 at 19a, the essential difference in beam sensor 19a being the use of a prism as at 106 for splitting the beam instead of a mirror, and a small depression at 107 for communicating a portion of the laser beam to the sensor differential amplifying means or the alternate unbalanced amplifying means.

SYSTEM LOGIC AND OPERATIONAL MODES

For an understanding of the system electronics and logic, reference is made particularly to FIGS. 1 and 2. FIG. 2 shows amplifying means 41 connected to signal-processing means 48, which is in turn connected to indicator panel 53. Likewise amplifying means 59, identical to means 41 is connected to signal-processing means 63, signal-processing means 63 being identical to means 48 and the output of means 63 being connected to indicator panel 68 which is identical to indicator panel 53. Amplifying means 73 which is identical to means 41 is connected to signal-processing means 76 which is identical to means 48, the output of means 76 being connected to indicator panel 81 which is identical to panel 53. Amplifying means 86 which is identical to means 41 is connected to signal-processing means 89, means 89 being identical to means 48, and the output of means 89 is connected to indicator panel 94 which is identical to indicator panel 53.

Signal-processing means 48 is connected to terminals 46 and 47 and is comprised of amplifier stage 49, the output thereof being connected to the input of amplifier-integrator 50, the output of means 50 being connected to time delay 51 for processing signals in accordance with a continuous laser beam input or in accordance with a chopped laser beam. Time delay 51 in turn is connected between the trigger element of silicon-controlled rectifier 52 and ground 36. Ground 36 herein serves as one of the main conductive terminals of rectifier 52, the other terminal thereof being connected to one side of lamp 54, the other side of lamp 54 being connected to contact 57 of pushbutton 55. Contact 58 of pushbutton 55 is connected to the direct current power input terminal 35 for providing electrical power to silicon-controlled rectifier 52 and a conductive path thereto due to the normally closed position of pushbutton 55 accomplished by cooperation of movable contactor 56 with contacts 57 and 58 of pushbutton 55. The lamp 54 will light when conduction of current through the main conductive terminals of silicon-controlled rectifier 52 occurs, and hence indicate an intruder across the perimeter portion bounded by laser beam component 14a.

The amplifier integrator 50 cooperates with the time delay 51 to determine the duration that the laser beam is interrupted or the number of pulses, if a pulse laser beam is utilized, that the sensor fails to sense. Accordingly, if the laser beam is interrupted for a predetermined time or if a predetermined number of pulses of a pulse laser beam are not sensed by the sensor the SCR 52 is triggered to indicate that an intruder has entered the protected area. The amplifier-integrator 50 and the time delay 51 control the sensitivity of the system and can be set so that the interruption of the laser beam for a predetermined time or the interruption of one of the pulses of the laser beam will not trigger the SCR 52. Thus, a small animal or an object which might quickly pass through the path of the laser beam will not activate an alarm. However, an intruder which will interrupt the beam for a longer period of time or will interrupt more than one pulse of a pulsing laser beam will activate the system.

Components in signal processor 63 are identical to components in processor 48. Specifically, amplifier 64 is the same as amplifier 49, amplifier-integrator 65 is the same as amplifier-integrator 50, and time delay 66 is the same as time delay 51; further, where amplifying means 59 is equal to amplifying means 41, and panel 68 having lamp 69 and pushbutton 70 is identically the same and similarly connected as is panel 53, the results obtained when laser component 14b is interrupted causes conduction of silicon-controlled rectifier 67 and illumination of lamp 69 to occur. Pushbutton 70 would have to be manually depressed to extinguish lamp 69.

Components in amplifying means 73 are the same as that in means 41. Components of signal-processing means 76 are identical to components of means 48. Hence, amplifier 77 is the same as amplifier-integrator 78 is the same as amplifier-integrator 50, time delay 79 is the same as time delay 51, and silicon-controlled rectifier 80 is the same as silicon-controlled rectifier 52. Further, panel 81 is the same as panel 53 which establishes that lamp 82 is the same as lamp 54, and pushbutton 83 is the same as pushbutton 55. Consequently, when laser component 14c is interrupted by an intruder, conduction of rectifier 80 occurs and lamp 82 is illuminated. Pushbutton 83 must be manually depressed to extinguish lamp 82 and stop conduction of rectifier 80.

Components in amplifying means 86 are the same as those in means 41. Components of signal-processing means 89 are identical to components of means 48. Hence, amplifier 90 is the same as amplifier 49, amplifier-integrator 91 is the same as amplifier-integrator 50, time delay 92 is the same as time delay 51, and silicon-controlled rectifier 93 is the same as silicon-controlled rectifier 52. Further, panel 94 is the same as panel 53 which means that lamp 95 is the same as lamp 54, and pushbutton 96 is the same as pushbutton 55. Consequently, when laser component 14d is interrupted by an intruder, conduction of rectifier 93 occurs and lamp 95 is illuminated. Pushbutton 96 must be manually depressed to extinguish lamp 95 and stop conduction of rectifier 93.

The output of amplifier 49 is connected to the input of inhibit circuit 60, to the input of OR-gate 71 and to the input of OR-gate 84. The output of amplifier 64 is connected to another input of OR-gate 71 and to another input of OR-gate 84. The output of amplifier 77 is connected to a third input of OR-gate 84. The output of OR-gate 71 is connected to the input of inhibit circuit 72, the output of inhibit circuit being connected to the input of amplifier 77 at terminal 74. The output of OR-gate 84 is connected to the input of inhibit circuit 85, the output of inhibit circuit 85 being connected to the input of amplifier 90 at terminal 87.

Consequently, when laser beam component 14a is interrupted by an intruder, amplifying means 41 provides a signal output which lights lamp 54 in panel 53. At the same time, a signal output from amplifier 49 which is provided to inhibit circuit 60, inhibit circuit 72 and inhibit circuit 85, cuts off action of signal processors 63, 76 and 89 and prevents the other three subsystems from providing alarm. Without the inhibit circuits, the alarms would be provided to the other three panels inasmuch as when component beam 14a is interrupted or otherwise becomes abnormally modulated by introduction of intrusion apparatus when a chopper-modulator is used, laser components 14b, 14c and 14d being a continuum of component 14a, would normally activate the alarm circuits were it not for the inhibit actions just described. Similarly, when laser beam component 14b is interrupted, component 14a would not be affected but components 14c and 14d would. In this instance, amplifying means 59 would provide signal output to signal processor 63 and lamp 69 would illuminate. However, again due to action of inhibitors 72 and 85 upon the circuits which they respectively control, signal processors 76 and 89 would be inhibited and lamps 82 and 95 would not illuminate.

Again and similarly, when laser beam component 14c is interrupted, components 14a and 14b would not be affected, but component 14d would. In this instance, amplifying means 73 would provide signal output to signal processor 76 and lamp 82 would be illuminated. However, again due to action of inhibitor 85 upon circuit 89, lamp 95 would not be illuminated.

When laser beam component 14d is interrupted, laser components 14a, 14b and 14c would not be affected. Hence, only amplifying means 86 would provide a signal to processing means 89 and would illuminate lamp 95 only.

In the manner and modes above described, it is seen that a simple logic system determines the control of the particular portion of the amplifying, processing and indicating means to provide identification of the specific perimeter portion where intrusion might be taking place, so that security guards could be dispatched to the exact perimeter portion immediately and not waste time in exploring perimeter portions where intrusion is not taking place.

What is claimed is:

1. An intrusion detection laser system comprising means for generating a laser beam and for directing the beam in position extending along the perimeter of an area so as to be interrupted by a person crossing said perimeter, a plurality of sensors responsive to energy of said laser beam at points that are spaced successively farther from the beam-generating means along said laser beam, each sensor sensing any interruption of the laser beam between the beam-generating means and that sensor, a plurality of indicating means controlled each by a corresponding sensor for offering an indicating signal when the sensor senses an interruption of the laser beam, and inhibit means controlled by one of the sensors and effective when said one sensor senses an interruption of the laser beam to inhibit a signal by the indicating means of a further one of the sensors, so that indicating signals that are incidental to interruptions of said laser beam may distinctly indicate each of at least two particular parts of the area perimeter that may be crossed by an intruder.

2. The system set forth in claim 1 in which there are laser-beam-splitting means positioned in said beam at one of said points along the beam, and including means directing a part of the energy of said laser beam toward a corresponding sensor, said laser beam continuing past the beam-splitting means to direct a further part of its energy toward a point successive to said one point along the beam.

3. The system set forth in claim 1 said sensors in effect following one another in order due to the successive spacing of laser beam points at which they respond, and said inhibit means including means for inhibiting signals by the indicating means of all the sensors that may follow said one sensor in order.

4. A laser perimeter intrusion system for protecting a predetermined area from intrusion by an intruder comprising, a first control station, a laser beam generator located at said first control station for providing a laser beam directed in a first path, a second control station disposed in said first path, means located at said second control station for directing said laser beam from said first path to a second path, a third control station disposed in said second path, first sensing means located at said second control station for sensing said laser beam directed in said first path and operable to provide a first signal in response to interruption of said laser beam in said first path by an intruder, second sensing means located at said third control station for sensing said laser beam directed in said second path and operable to provide a second signal in response to interruption of said laser beam directed in said second path by an intruder, said interruption of said laser beam directed in said first path by an intruder effecting interruption of said laser beam directed in said second path, means responsive to said first signal for providing a first output signal for indicating the interruption of said laser beam in said first path, means responsive to said second signal for providing a second output signal indicating the interruption of said laser beam directed in said second path, and means responsive to said first output signal for preventing initiation of said second output signal in response to interruption of said laser beam directed in said first path by an intruder.

5. A laser perimeter intrusion system as defined in claim 4 wherein at least one of said sensing means includes means responsive to the intensity of said laser beam which said one sensing means is operable to sense and operable to provide a first control signal dependent thereon, means responsive to the ambient light and operable to provide a second control signal dependent thereon, and comparator means for comparing said first and second control signals and providing said signal associated with said one sensing means when said first and second control signals differ by a predetermined amount to thereby indicate the interruption of said laser beam by an intruder which said one sensing means is operable to sense.

6. A laser perimeter intrusion system as defined in claim 5 wherein said means responsive to the intensity of said laser beam includes first radiation-sensitive means, said means responsive to said ambient light includes second radiation-sensitive means and said comparator means includes a differential amplifier.

7. A laser perimeter intrusion system as defined in claim 4 wherein said means responsive to said first output signal for preventing initiation of said second output signal includes inhibit circuit means connected to the output of said first sensing means and to said second sensing means, said inhibit circuit means having a first condition enabling said second sensing means to initiate said second output signals in response to interruption of said laser beam directed in said second path by an intruder and a second condition preventing the initiation of said second output signal from said second sensing means in response to said first signal from said first sensing means.

8. A laser perimeter system as defined in claim 4 further including direction-changing means located at said second control station for directing said laser beam from said first path to said second path.

9. A laser perimeter system as defined in claim 8 wherein said direction-changing means includes a mirror having an aperture therein said first sensing means being disposed behind said aperture, said mirror directing said laser beam from said first path to said second path and said aperture enabling said laser beam in said first path to engage with said sensing means.

10. A laser perimeter system as defined in claim 8 wherein said direction-changing means comprises a prism having a depression therein, said prism directing said laser beam from said first path to said second path and said first sensing means being responsive to a portion of said laser beam communicated by said depression thereto.

11. A laser perimeter system as defined in claim 5 further including first indicating means responsive to said first output signal for providing a visual indication of the interruption of said laser beam in said first path by an intruder, second indicating means responsive to said second output signal for providing a visual indication of the interruption of said laser beam in said second path by an intruder, first means for manually disabling said first indicating means and second means for manually disabling said second indicating means.

12. A laser perimeter intrusion system as defined in claim 4 wherein said laser beam is a pulsating laser beam.

13. A laser perimeter intrusion system as defined in claim 12 wherein said means responsive to said first signal for providing a first output signal for indicating the interruption of said pulsating laser beam in said first path by an intruder includes integrator means for integrating said first signal to determine if said first sensing means fails to sense a predetermined number of individual pulses of said pulsating laser beam and time delay means for determining the number of pulses that said first sensing means fails to sense during a predetermined time interval and said means responsive to said second signal for providing a second output signal indicating the interruption of said pulsating laser beam directed in said second path by an intruder includes integrator means for integrating said second signal to determine if said second sensing means fails to sense a predetermined number of individual pulses of said pulsating laser beam and time delay means for determining the number of pulses that said second sensing means fails to sense during a predetermined time interval.

* * * * *